United States Patent
Kerr

(10) Patent No.: US 6,857,333 B2
(45) Date of Patent: Feb. 22, 2005

(54) ROTATIONAL STOP

(75) Inventor: Roger S. Kerr, Brockport, NY (US)

(73) Assignee: Eastman Kodak Company, Rochester, NY (US)

( * ) Notice: Subject to any disclaimer, the term of this patent is extended or adjusted under 35 U.S.C. 154(b) by 12 days.

(21) Appl. No.: 10/135,627

(22) Filed: Apr. 30, 2002

(65) Prior Publication Data

US 2003/0200828 A1 Oct. 30, 2003

(51) Int. Cl.[7] .............................................. F16H 25/20
(52) U.S. Cl. ..................... 74/89.36; 74/89.23; 74/89.34
(58) Field of Search ............................ 74/89.23, 89.22, 74/89.32, 89.34, 89.36

(56) References Cited

U.S. PATENT DOCUMENTS

| | | | | |
|---|---|---|---|---|
| 4,779,473 A | * | 10/1988 | Grady et al. ................ | 74/89.36 |
| 4,787,260 A | * | 11/1988 | Bailey ........................ | 74/89.36 |
| 5,809,829 A | * | 9/1998 | Seto et al. .................. | 74/89.36 |
| 5,818,497 A | | 10/1998 | Kerr et al. .................. | 347/234 |
| 5,829,889 A | * | 11/1998 | Kerr et al. .................. | 384/446 |
| 6,033,138 A | | 3/2000 | Kerr ........................... | 400/328 |
| 6,208,368 B1 | * | 3/2001 | Kerr ........................... | 347/242 |
| 6,247,785 B1 | * | 6/2001 | Jones et al. ................. | 347/37 |

* cited by examiner

Primary Examiner—David A. Bucci
Assistant Examiner—Julie K. Smith
(74) Attorney, Agent, or Firm—Stephen H. Shaw

(57) ABSTRACT

A rotational stop that includes: a lead screw having a longitudinal axis, a motor integrally mounted to the lead screw, wherein the motor provides rotation to the lead screw; a slide mounted to a support structure to provide movement relative to the lead screw longitudinal axis; a rotational control plate attached to the motor and having a plurality of protrusions extending from the rotational control plate, and; a rotational control guide having a rotational control surface on its face, wherein the rotational control surface is in intimate contact with the plurality of protrusions extending from the rotational control plate such that linear error is substantially reduced.

5 Claims, 6 Drawing Sheets

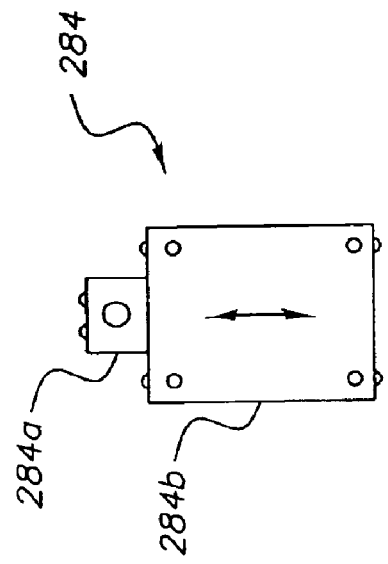
FIG. 7b
(PRIOR ART)
FIG. 7c
(PRIOR ART)
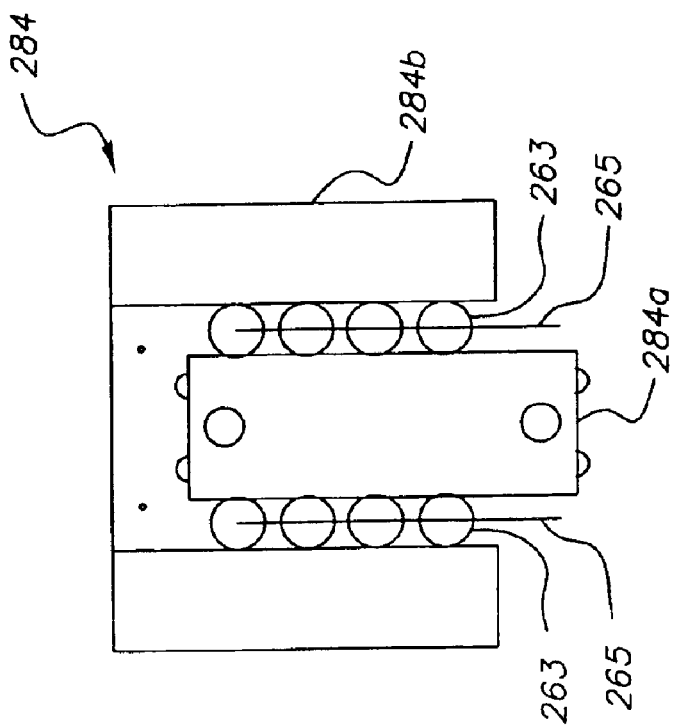
FIG. 7a
(PRIOR ART)

ROTATIONAL STOP

FIELD OF THE INVENTION

The present invention relates to an image processing apparatus and a method for exposing an image on an imaging drum to form a pre-press proof (herein, referred to as an intended image) as used in the printing industry, but not necessarily limited to the printing industry. More particularly, the present invention relates to an image processing apparatus with improved rotational control, and improved image quality of the intended image produced by the image processing apparatus.

BACKGROUND OF THE INVENTION

Pre-press proofing is a procedure that is used mainly by the printing industry for creating representative or intended images of requested printed material without the high cost and time that is required to actually produce printing plates. Time may also be critical for setting up a high speed, high volume printing press to produce an intended image. The intended image may require several corrections and be reproduced several times to satisfy or meet customers' requirements, resulting in a large loss of profits for the printer and higher cost for customers.

One such commercially available image processing apparatus is structured to form an intended image on a sheet of print media. A colorant is transferred from a sheet of donor material to a sheet of print media. The transfer is done by applying a sufficient amount of energy to the donor sheet material to form an intended image on the print media. The image processing apparatus generally includes a material supply assembly, a lathe bed scanning subsystem or write engine, which includes a lathe bed scanning frame, translation drive, linear drive motor, translation stage member, print-head, load roller, imaging drum, print media exit transport, and donor sheet material exit transport.

Operation of the above image processing apparatus includes metering a length of the print media (in roll form) from the material assembly. The print media is then cut into sheet form, of the required length, and transported to the imaging drum. Subsequently, the print media is wrapped around and secured onto the imaging drum. A load roller, which is also known as a squeegee roller, removes entrained air between the imaging drum and the print media. Next, a length of donor material (in roll form) is metered out of the material supply assembly or carousel, and cut into sheet form of the required length. The donor material is then transported to the imaging drum and wrapped around the periphery of the imaging drum. The load roller removes any air entrained between the imaging drum, print media, and the donor material. The donor material is now superimposed in the desired registration, with respect to the print media, which has already been mounted onto the imaging drum.

With the donor sheet material and print media secured to the periphery of the imaging drum, the scanning subsystem or write engine, provides the scanning function. This is accomplished by retaining the print media and the donor sheet material on the imaging drum while it is rotated past the print head. The translation drive axially traverses both the print head and translation stage member, along the axis of the imaging drum, in coordinated motion with the rotating imaging drum. These combined movements form an intended image onto the print media.

After the intended image has been formed on the print media, the donor sheet material is removed from the imaging drum without disturbing the print media beneath it. Next, the donor sheet material is transported out of the image processing apparatus to a waste bin. Additional donor sheet materials are sequentially superimposed with the print media on the imaging drum, further producing an intended image. With the completed intended image formed on the print media, the print media is removed from the imaging drum and transported to an external holding tray on the image processing apparatus.

Referring to FIG. 1, a prior art schematic of a rotational stop 230 for a linear drive motor 258, that is used in an image processing apparatus, is shown. The linear drive motor 258 is coupled to a threaded shaft 252 of a lead screw assembly 250 (shown, subsequently, in FIG. 3) Rotational stop 230 includes a stop button 261 that provides a single point of contact against a flat surface, where the rotational stop 230 is held by load magnet 286.

In prior art imaging apparatuses, linear error can occur when there is angular displacement of the linear drive motor 258 relative to the rotational stop 230. FIG. 2 shows linear error ($\epsilon$) due to angular displacement ($\alpha$) that is directly related to the location or distance of a stop button 261 relative to the linear drive motor 258. The greater the distance between the stop button 261 and the linear drive motor 258, the smaller the linear error ($\epsilon$) will be. For some applications, however, it is impractical to place the stop button 261 at a great enough distance to have an acceptable small linear error ($\epsilon$).

A person can see evidence of unacceptable linear error in an intended image by the amount of banding that is displayed in the intended image. Linear error due to angular displacement will cause the exposure distribution or density to be non-uniform. Banding in an intended image is a phenomenon that can be characterized as a periodic exposure density variation in an intended image. Conversely, a visually pleasing intended image should be uniform in exposure density. In general, the linear drive motor imparts rotation to the lead screw, which traverses the print head axially along the rotating imaging drum. As the print head traverses along the imaging drum an intended image is formed onto the print media, in the form of rows of halftone dots around the imaging drum. With each rotation of the imaging drum the print head is moved axially along the imaging drum and another row of halftone dots are formed onto the print media. One can easily understand that errors such as angular displacement could cause one row of half tone dots to be out of position relative to the next row of halftone dots, thereby causing banding in an intended image.

Although the presently known and utilized image processing apparatus is satisfactory, a need still exists to improve rotational error and reduce banding within the intended image.

SUMMARY OF THE INVENTION

The present invention is directed to overcoming the problems set forth above. Briefly summarized; the present invention resides in a rotational stop that includes: a lead screw having a longitudinal axis; a motor integrally mounted to the lead screw, wherein the motor provides rotation to the lead screw; a slide mounted to a support structure to provide movement relative to the lead screw longitudinal axis; a rotational control plate attached to the motor and having a plurality of protrusions extending from the rotational control plate, and; a rotational control guide having a rotational control surface on its face, wherein the rotational control surface is in intimate contact with the plurality of protrusions extending from the rotational control plate such that linear error is substantially reduced.

Another embodiment of the present invention includes a method for reducing linear error in a linear translation subsystem, that includes the steps of: a) providing rotational control with a rotation control plate having ball bearings and attached to a linear drive motor; b) means for enabling the ball bearings to make contact with a rotational control surface of a rotational guide; c) means for loading the rotational control plate to the rotational guide with at least one load magnet; and d) providing a ball slide that in combination with the ball bearings constrains the linear drive motor within one degree of freedom and reduces linear error of the linear translation subsystem.

Yet another embodiment of the present invention includes a method for reducing linear error in a linear translation subsystem, that includes the steps of: a) providing rotational control with a rotational control plate having ball bearings and attached to a linear drive motor; b) means for enabling the ball bearings to make contact with a rotational control surface of a rotational control stage; c) means for loading the rotational control plate to the rotational control stage with at least one load magnet; and d) providing a three-plane mount that in combination with the ball bearings constrains the linear drive motor within one degree of freedom and reduces linear error of the linear translation subsystem.

BRIEF DESCRIPTION OF THE DRAWINGS

A more complete understanding of the invention and its advantages will become apparent from the detailed description taken in conjunction with the accompanying drawings, wherein examples of the invention are shown, and identical reference numbers have been used, where possible, to designate identical elements that are common to the figures referenced below:

FIG. 7A is a top view of a prior art ball slide;

FIG. 7B is side view of a ball bearing holder for the aforementioned prior art ball slide; and FIG. 7C is a front view of the prior art ball slide.

DETAILED DESCRIPTION OF THE INVENTION

Figure 1:
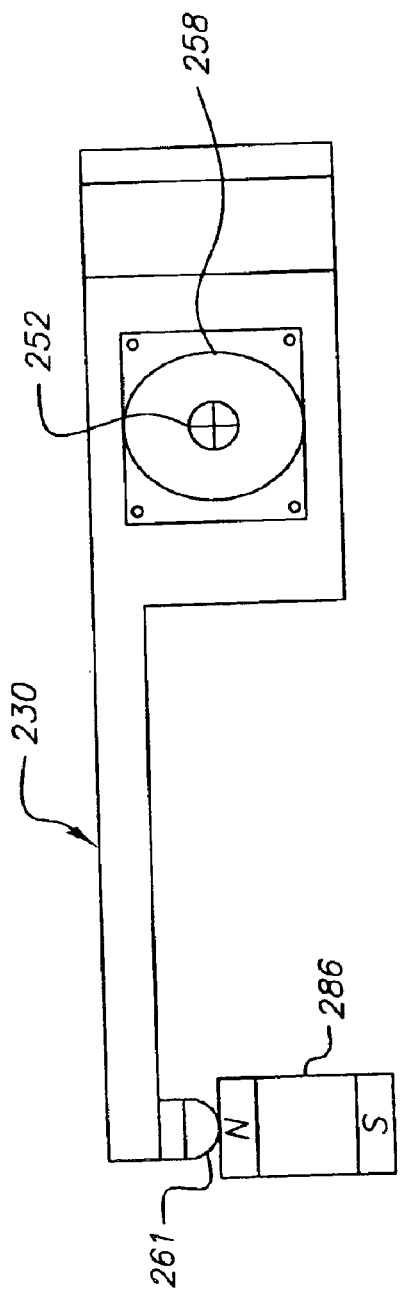
FIG. 1 is a side view in vertical cross-section of a prior art image processing apparatus.
Figure 2:
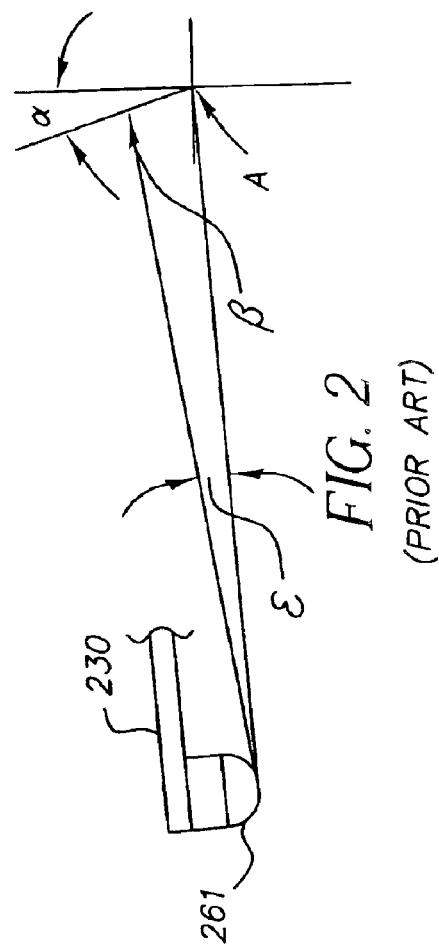
FIG. 2 shows (prior art) linear error and angular displacement as they relate to a linear drive motor.

In the following description, like reference characters designate like or corresponding parts throughout the several views. Also, in the following description, one should understand that such terms as "front," "rear," "lower," "upper," and the like are words of convenience and are not to be construed as limiting terms. Referring to the drawings, the invention will be described in more detail.

Figure 3:
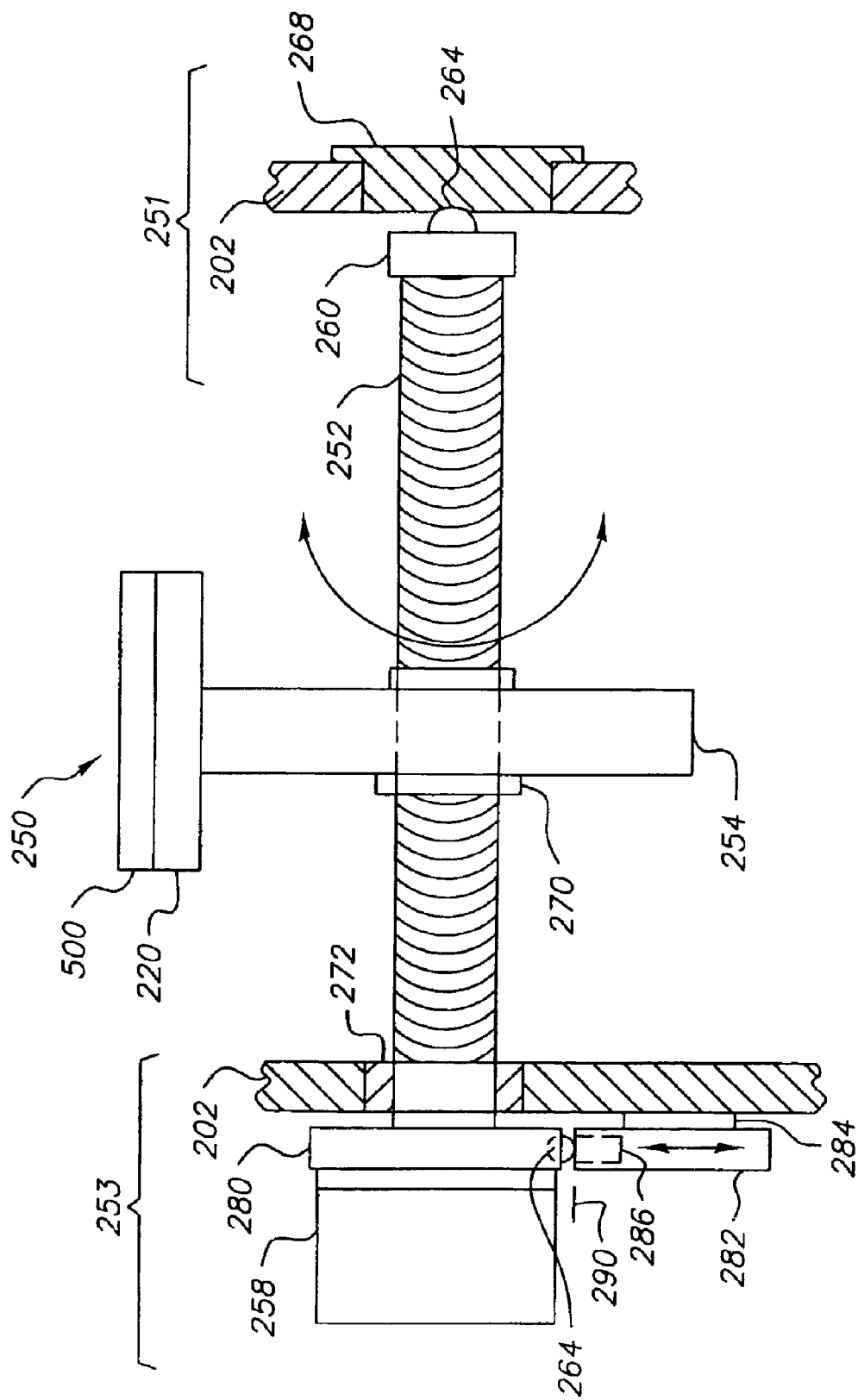
FIG. 3 is a partial side view in horizontal cross-section, of the linear translation system according to the present invention.

Referring to FIG. 3, the print head 500 is shown mounted on the translation stage 220 of lead screw assembly 250 which consists of an elongated threaded shaft 252 with the linear drive motor 258 attached to the drive end 253 of the lead screw assembly 250 to provide rotation of the elongated threaded shaft 252. The lead screw assembly 250 is mounted for rotation and supported by the lathe bed scanning frame 202 by means of a radial bearing 272 at the drive end and a protrusion 264, that provides an axial stop, at the load end 251. The protrusion 264 is in intimate contact with a rotational control plate 280 and a rotational control surface 290 of a rotational control guide 282. A load magnet 286 provides a force upon protrusion 264. An axial load magnet 260 that is mounted to the elongated threaded shaft 252 and magnetically attracted to end cap 268 provides an axial pre-load of the lead screw assembly 250. The lead screw drive nut 270 is integrally attached to the translation stage member 220 through the lead screw coupling 254 so that when the elongated threaded shaft 252 is rotated by the linear drive motor 258 the lead screw drive nut 270 is moved axially along the elongated threaded shaft 252, which in turn moves the translation stage member 220, and ultimately the print head 500 axially along the axis of an imaging drum(not shown).

In a conventional imaging apparatus the linear drive motor's shaft 252 is integrally mounted to the lead screw assembly 250, as shown in FIG. 3, for example by a collar or a set screw or a split-collar, or a collar clamp, or a coupling. Run-out of the lead screw assembly 250, that is how much wobble the lead screw assembly 250 has due to the mounting of the linear drive motor's shaft, can occur. Essentially, the lead screw assembly 250 seems bent. The wobble of the lead screw assembly 250 causes angular displacement of the linear drive motor 258 relative to the rotational stop 230. The rotational stop 230 can include a spherical protrusion such as a stop button 261 as shown in U.S. Pat. No. 6,033,138, by Kerr, titled "Magnetically Held Motor Stop For Use In A Printer Carriage Feed Mechanism," issued Mar. 7, 2000. The rotational stop 230 could also include a rod or any other shape, or even be spring-loaded, as long as it stops the rotation of the linear drive motor 258. Specifically, U.S. Pat. No. '138 describes a magnetic rotational stop.

The present invention is directed at reducing linear error by reducing angular displacement of the linear drive motor 258 relative to a combination of parts that form a rotational stop 230. The angular displacement of the linear drive motor 258 is reduced by stopping the rotation of the linear drive motor 258 within 0.100 of an inch. Consequently, one obtains a more reliable rotational stop and improved image quality of an intended image by reducing banding within the intended image. Banding occurs because of angular displacement of the linear drive motor 258 which translates into linear error. In addition, one should understand that while the present invention is described as a rotational stop 230 for a linear drive motor 258, the present invention could be utilized to provide a means to prevent or improve rotational control of other applications or devices such as encoders and couplings that are well known in the art.

Figure 4:
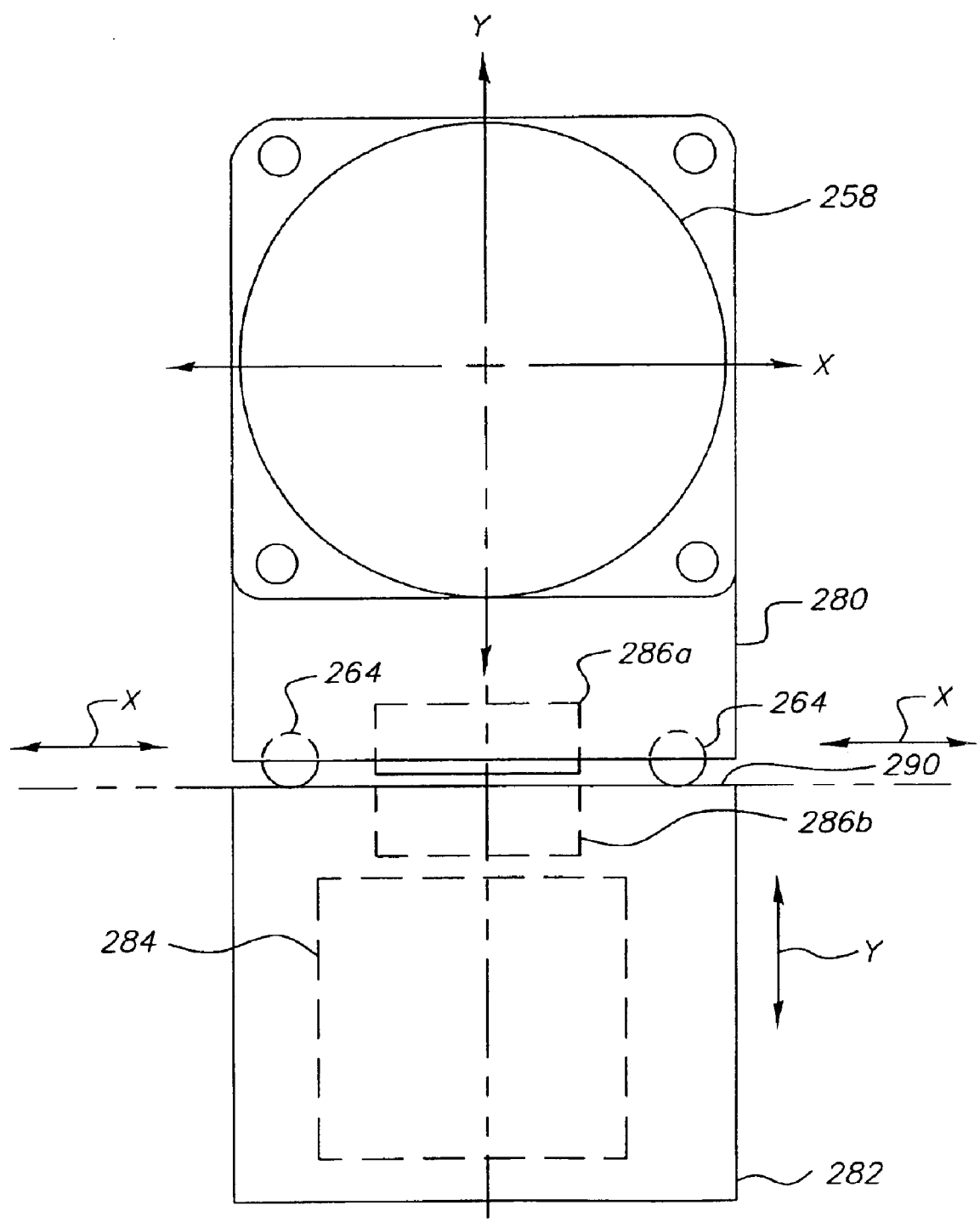
FIG. 4 is a partial end view, of the linear translation system according to the present invention.

Referring to FIG. 4, the rotational control plate 280 is attached to the linear drive motor 258. Extending from the rotational control plate 280 are two protrusions 264, such as ball bearings that make contact with the rotational control surface 290 on the face of the rotational control guide 282. The protrusions 264 may include, without limitation, ball bearings, spherical stop buttons or radial ends, and other protrusions that are of several geometrical shapes. Two load magnets 286a and 286b provide a loading force to the rotational control plate 280 to the rotational control guide 282. Only one of the load magnets 286a or 286b are required if one or both of the rotational control plate 280 and the rotational control guide 282 are made of a ferrous material. If either rotational control plate 280 or the rotational control guide 282 is of a ferrous material, the other one would contain the load magnet 286a or 286b. It should be noted that two or more load magnets 286a and 286b provide a higher loading force. The rotational control guide 282 is mounted to the slide 284, which in turn is mounted to the lathe bed-scanning frame 202 (as shown in FIG. 3). It should be noted that the slide 284 could be any type of slide known in the art, for example, linear slides, cross-roller or roller slides, and ball slides. The slide 284 may be friction-less or impart minimal friction. This combination of parts prevents the linear drive motor 258 from rotating or constrains the linear drive motor 258 within one degree of freedom, and forms the rotational stop 230. The slide 284 allows the linear drive motor 258 to move in a degree of freedom while the protrusions 264 allow the linear drive motor 258 to move in four degrees of freedom. The protrusions 264 are loaded against the rotational control surface 290 of rotational control guide 282 by means of the load magnets 286. By preventing rotation of the linear drive motor 258 with the rotational control plate 280, the angular force on the motor's shaft is imparted to the lead screw assembly 250 (shown in FIG. 3) which moves the print head 500.

Figure 5:
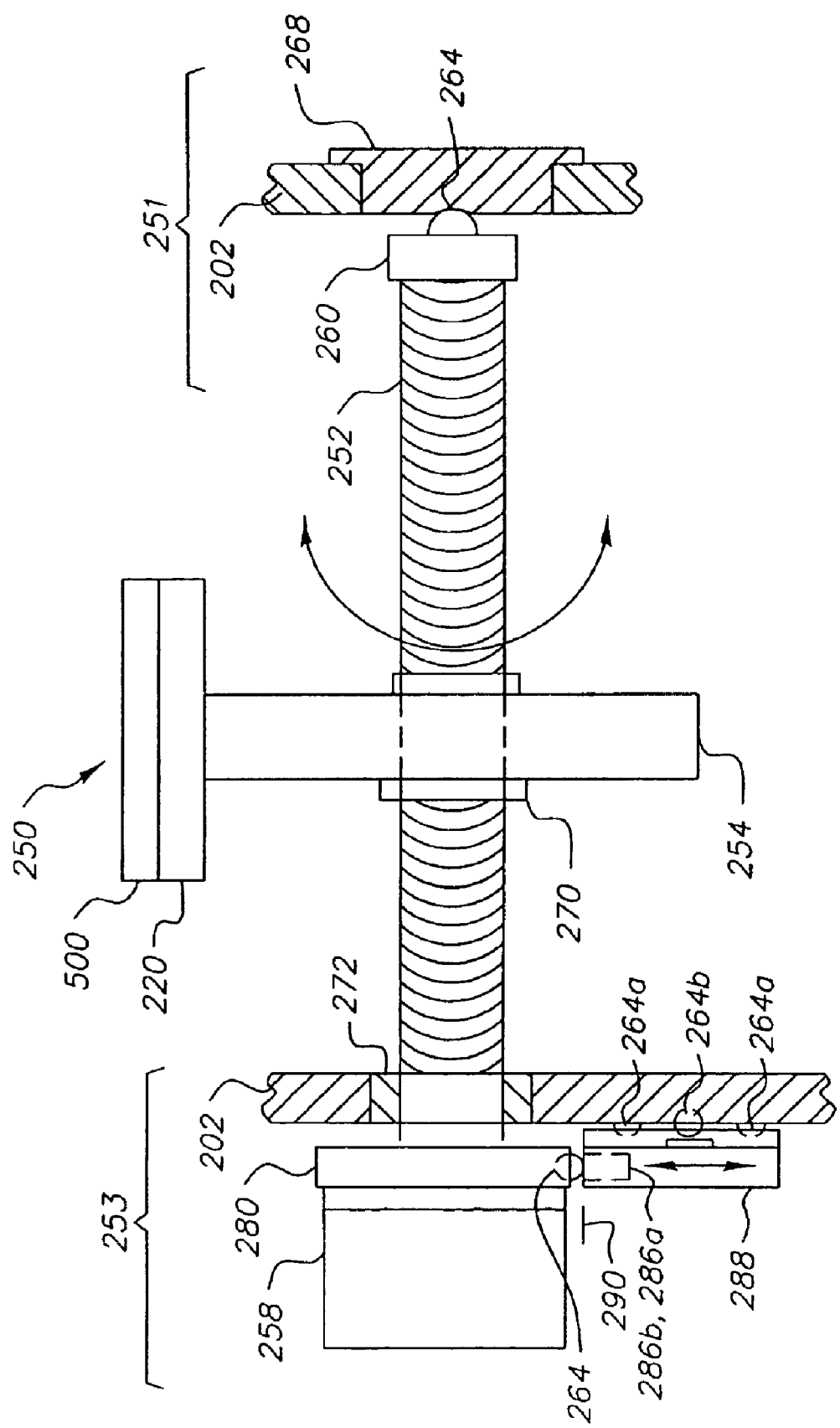
FIG. 5 is a partial side view in horizontal cross-section, of the linear translation system according to a second embodiment of the present invention.
Figure 6:
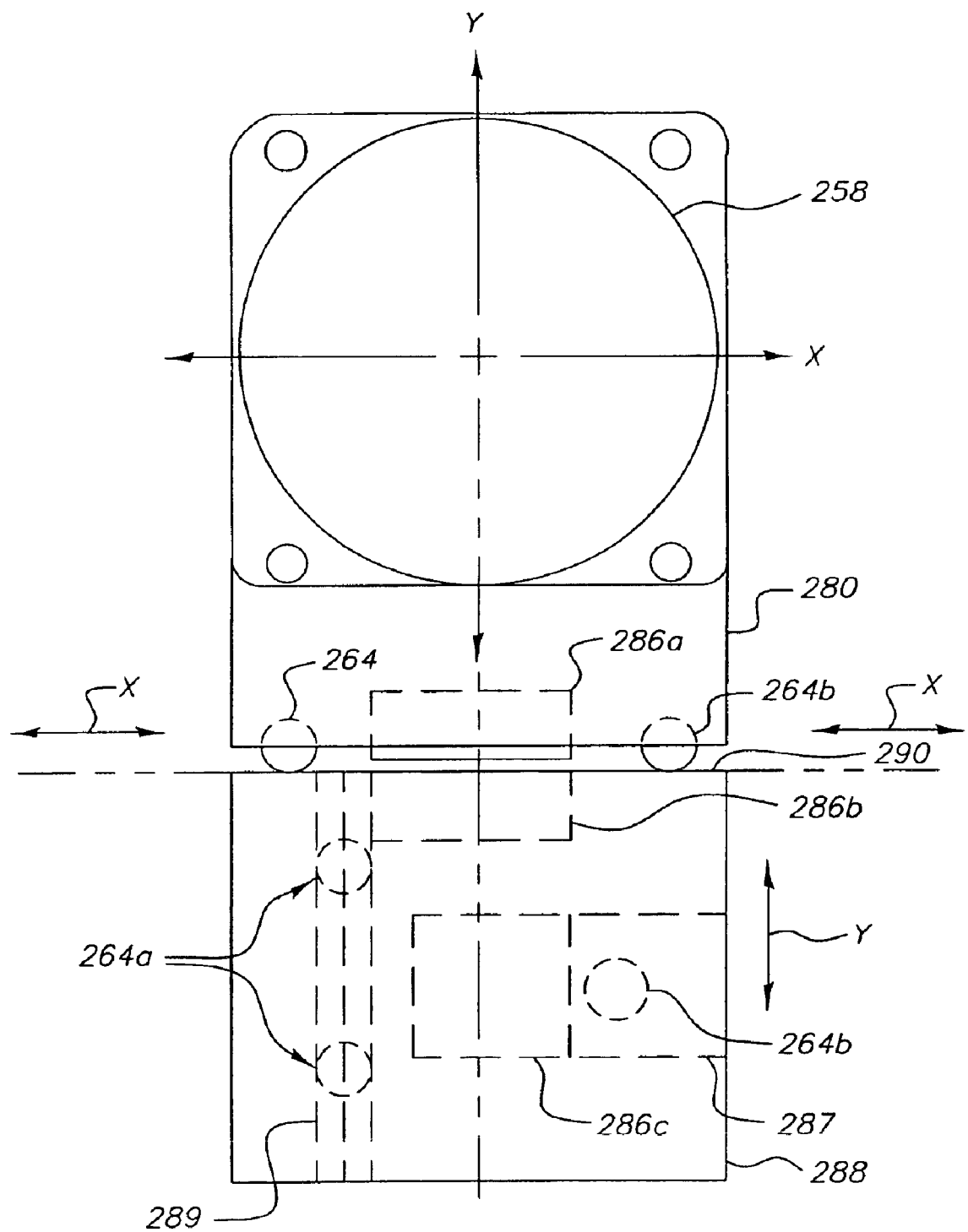
FIG. 6 is a partial end view, of the linear translation system according to a second embodiment of the present invention.

FIGS. 5 and 6 show an alternate embodiment with the rotational control guide 282 and slide 284 of FIGS. 3 and 4 being replaced by a rotational control stage 288. The rotational control stage 288 is magnetically loaded to the lathe bed scanning frame 202 by means of a load magnet 286c that provides a loading force to constrain the rotational control stage 288, within five degrees of freedom, by means of ball bearings 264a and 264b, that are in general protrusions 264, (wherein 264a are dual ball bearings and 264b is a single ball bearing). The combination of dual ball bearings 264a and a single ball bearing 264b form a three-plane mount that is well-known in the art. Once again, any protrusions 264 may be ball bearings or spherical stop buttons, etc.

Two load magnets 286a and 286b provide a loading force to the rotational control plate 280 to the rotational control guide 288. Only one of the load magnets 286a or 286b are required if one or both of the rotational control plate 280 and the rotational control guide 288 are made of a ferrous material. If either rotational control plate 280 or the rotational control guide 288 is of a ferrous material, the other one would contain the load magnet 286. It should be noted that two or more load magnets 286a and 286b provide a higher loading force. This embodiment allows a single degree of freedom, thereby providing the same movement as the slide 284, only with better overall performance. Dual ball bearings 264a are arranged to locate the rotational control stage 288 by means of a V-groove 289 (shown in FIG. 6 with hidden lines) in both the vertical and the horizontal directions, such that the axis formed by the dual ball bearings 264a is perpendicular to the rotational control surface 290 and parallel to the x axis. A single ball bearing 264b locates the rotational control stage 288 by means of a rotational control pad 287 (shown in FIG. 6 with hidden lines), only with respect to rotation of the rotational control stage 288 about the dual ball bearings 264a. This is done so that there is no over-constraint of the translation stage member 220, which might cause it to bind, chatter, or otherwise impart undesirable vibration or jitters to the linear drive motor 258 during the generation of an intended image, unlike other types of slides, such as ball slides. This type of mounting is known in the art as a three plane mount.

FIG. 7A shows a top view of a prior art slide 284 that happens to be a ball slide. Accordingly, the ball slide 284 includes a slider 284a, a ball slide frame 284b, a plurality of ball bearings 263 and two ball bearing holders 265 that prevent ball bearings 263 from spilling. The ball bearings 263 ride in an integrated rail (not shown) on 284b and enable the slider 284a to move freely. Referring to FIG. 7B, the plurality of ball bearings 263 are shown in ball bearing holder 265. The sliding function of ball slide 284 is shown in FIG. 7C, wherein the ball slide frame 284b can slide vertically should the slider 284a be fixed or restrained or in the alternative, wherein the slider 284a freely moves and the ball slide frame 284b is restrained or fixed.

The invention has been described in detail with particular reference to certain preferred embodiments thereof, but it will be understood that variations and modifications can be effected within the spirit and scope of the invention as described hereinabove and as defined in the appended claims by a person of ordinary skill in the art, without departing from the scope of the invention. While preferred embodiments of the invention have been described using specific terms, this description is for illustrative purposes only. It is intended that the doctrine of equivalents be relied upon to determine the fair scope of these claims in connection with any other person's product which fall outside the literal wording of these claims, but which in reality do not materially depart from this invention.

PARTS LIST 202 lathe bed scanning frame
220 translation stage
230 rotational stop
250 lead screw assembly
251 load end
252 threaded shaft
253 drive end
254 lead screw coupling
258 linear drive motor
260 axial load magnet
261 stop button
263 plurality of ball bearings
264 protrusion
264a dual ball bearing
264b single ball bearing
265 ball bearing holder
268 end cap
270 lead screw drive nut
272 radial bearing
280 rotational control plate
282 rotational control guide
284 slide
284a slider
284b ball slide frame
286 load magnet
286a load magnet
286b load magnet
286c load magnet
287 rotational control pad
288 rotational control stage
289 v-groove
290 rotational control surface
500 print head

What is claimed is:

1. A rotational stop, comprising:

a) a lead screw having a longitudinal axis;

b) a motor integrally mounted to the lead screw, wherein the motor provides rotation to the lead screw;

c) a slide mounted to a support structure to provide movement relative to the lead screw longitudinal axis;

d) a rotational control plate attached to the motor and having a plurality of protrusions extending from the rotational control plate; and e) a rotational control guide mounted on the slide and having a rotational control surface on its face for stopping rotation of the motor, wherein the rotational control surface is in intimate contact with the plurality of protrusions extending from the rotational control plate to stop rotation of the motor such that linear error is substantially reduced.

2. The rotational stop as claimed in claim 1, wherein the rotational control plate has a radial end that is in intimate contact with the rotational control surface.

3. The rotational stop as claimed in claim 2, wherein the rotational control plate has spherical buttons in intimate contact with the rotational control surface.

4. The rotational stop as claimed in claim 1, wherein, the rotational stop includes a permanent magnet that provides a constraining force for the motor.

5. The rotational stop as claimed in claim 1, wherein, the rotational stop includes an electromagnet that provides a constraining force for the rotational stop.

* * * * *